(12) United States Patent
Kroeger et al.

(10) Patent No.: US 9,768,853 B1
(45) Date of Patent: Sep. 19, 2017

(54) METHOD AND APPARATUS FOR BLENDING AN AUDIO SIGNAL IN AN IN-BAND ON-CHANNEL RADIO SYSTEM

(71) Applicant: iBiquity Digital Corporation, Columbia, MD (US)

(72) Inventors: Brian W. Kroeger, Sykesville, MD (US); Paul J. Peyla, Elkridge, MD (US); Jeffrey S. Baird, Columbia, MD (US)

(73) Assignee: Ibiquity Digital Corporation, Columbia, MD (US)

( * ) Notice: Subject to any disclaimer, the term of this patent is extended or adjusted under 35 U.S.C. 154(b) by 0 days.

(21) Appl. No.: 15/071,389

(22) Filed: Mar. 16, 2016

(51) Int. Cl.
| | | |
|---|---|---|
| *G06F 11/10* | (2006.01) | |
| *H04B 7/08* | (2006.01) | |
| *H04B 1/10* | (2006.01) | |
| *H04H 20/22* | (2008.01) | |
| *H04H 40/18* | (2008.01) | |
| *H04L 1/00* | (2006.01) | |
| *H04L 7/00* | (2006.01) | |

(52) U.S. Cl.
CPC ......... *H04B 7/0885* (2013.01); *H04B 1/1027* (2013.01); *H04H 20/22* (2013.01); *H04H 40/18* (2013.01); *H04L 1/0045* (2013.01); *H04L 1/0061* (2013.01); *H04L 7/0054* (2013.01)

(58) Field of Classification Search
CPC .... H04B 7/0885; H04B 1/1027; H04H 20/22; H04H 40/18; H04L 1/0045; H04L 1/0061; H04L 7/0054
USPC ........ 714/807, 817, 746, 752; 455/131, 135, 455/130
See application file for complete search history.

(56) References Cited

U.S. PATENT DOCUMENTS

| | | | |
|---|---|---|---|
| 6,178,317 B1 | 1/2001 | Kroeger et al. | |
| 6,590,944 B1 | 7/2003 | Kroeger | |
| 6,735,257 B2 | 5/2004 | Kroeger | |
| 6,901,242 B2 | 5/2005 | Kroeger et al. | |
| 7,546,088 B2 | 6/2009 | Kroeger et al. | |
| 8,180,470 B2 | 5/2012 | Pahuja | |
| 2007/0291876 A1* | 12/2007 | Shridhar | H04H 40/18 375/316 |
| 2007/0293167 A1* | 12/2007 | Shridhar | H04H 40/18 455/130 |
| 2016/0241350 A1* | 8/2016 | Nekhamkin | G10L 19/0019 |

\* cited by examiner

*Primary Examiner* — Christine Tu
(74) *Attorney, Agent, or Firm* — Schwegman Lundberg & Woessner, P.A.

(57) ABSTRACT

A method for processing a digital audio broadcast signal in a radio receiver includes: receiving a digital audio broadcast signal; demodulating the digital audio broadcast signal to produce an analog audio stream and a digital audio stream; determining a digital signal quality value for the digital audio stream; blending an output of the radio receiver from the analog audio stream to the digital audio stream when the digital signal quality value exceeds an adaptive analog-to-digital threshold value; and blending the output of the radio receiver from the digital audio stream to the analog audio stream when the digital signal quality value falls below an adaptive digital-to-analog threshold value, wherein the adaptive digital-to-analog threshold value is lower than the adaptive analog-to-digital threshold value.

20 Claims, 6 Drawing Sheets

METHOD AND APPARATUS FOR BLENDING AN AUDIO SIGNAL IN AN IN-BAND ON-CHANNEL RADIO SYSTEM

FIELD OF THE INVENTION

The described methods and apparatus relate to digital radio receivers and, in particular, to methods and apparatus for blending of analog and digital pathways in digital radio receivers.

BACKGROUND OF THE INVENTION

Digital radio broadcasting technology delivers digital audio and data services to mobile, portable, and fixed receivers. One type of digital radio broadcasting, referred to as In-Band On-Channel (IBOC) digital audio broadcasting (DAB), uses terrestrial transmitters in the existing Medium Frequency (MF) and Very High Frequency (VHF) radio bands. HD Radio™ technology, developed by iBiquity Digital Corporation, is one example of an IBOC implementation for digital radio broadcasting and reception.

The National Radio Systems Committee, a standard-setting organization sponsored by the National Association of Broadcasters and the Consumer Electronics Association, adopted an IBOC standard, designated NRSC-5, in September 2005. NRSC-5, the disclosure of which is incorporated herein by reference, sets forth the requirements for broadcasting digital audio and ancillary data over AM and FM broadcast channels. The standard and its reference documents contain detailed explanations of the RF/transmission subsystem and the transport and service multiplex subsystems. Copies of the standard can be obtained from the NRSC at http://www.nrscstandards.org/standards.asp. iBiquity's HD Radio technology is an implementation of the NRSC-5 IBOC standard. Further information regarding HD Radio technology can be found at www.hdradio.com and www.ibiquity.com.

Both AM and FM In-Band On-Channel (IBOC) hybrid broadcasting systems utilize a composite signal including an analog modulated carrier and a plurality of digitally modulated subcarriers. Program content (e.g., audio) can be redundantly transmitted on the analog modulated carrier and the digitally modulated subcarriers. The analog audio is delayed at the transmitter by a diversity delay. Using the hybrid mode, broadcasters may continue to transmit analog AM and FM simultaneously with higher-quality and more robust digital signals, allowing themselves and their listeners to convert from analog-to-digital radio while maintaining their current frequency allocations.

The digital signal is delayed in the receiver with respect to its analog counterpart such that time diversity can be used to mitigate the effects of short signal outages and provide an instant analog audio signal for fast tuning. Digital radios operating in a hybrid analog-digital mode incorporate a feature called "blend" which attempts to smoothly transition between outputting analog audio and digital audio after initial tuning, or whenever the digital audio quality crosses appropriate thresholds.

In the absence of the digital audio signal (for example, when the channel is initially tuned) the analog AM or FM backup audio signal is fed to the audio output. When the digital audio signal becomes available, the blend function smoothly attenuates and eventually replaces the analog backup signal with the digital audio signal while blending in the digital audio signal such that the transition preserves some continuity of the audio program. Similar blending occurs during channel outages which corrupt the digital signal. In this case the analog signal is gradually blended into the output audio signal by attenuating the digital signal such that the audio is fully blended to analog when the digital corruption appears at the audio output.

Blending will typically occur at the edge of digital coverage and at other locations within the coverage contour where the digital waveform has been corrupted. When a short outage does occur, as when traveling under a bridge in marginal signal conditions, the digital audio is replaced by an analog signal. Various blend algorithms have already been developed and implemented in commercial HD Radio receivers. The existing algorithms detect corrupted digital audio frames by performing cyclic redundancy checks (CRCs) on corresponding audio packets. The CRC results (1=pass, 0=fail) are filtered over roughly one second to provide a short-term Digital Signal Measure (DSM). This time constant is short enough to initiate corrective action when the digital signal is poor. The output audio is blended from digital to analog when the digital signal is corrupted, i.e., when the filtered CRC success rate (DSM) falls below a predetermined threshold. Conversely, the output audio is blended from analog to digital when the DSM exceeds a higher predetermined threshold.

Other signal-quality metrics, such as signal-to-noise ratio (SNR) or signal-to-noise ratio values (Cd/No), have been employed to reduce frequent blends between analog and digital audio when the coverage is intermittent, such as in mobile multipath fading and shadowing. However, this has been found to unnecessarily reduce the static digital coverage area by several radial miles, corresponding to a loss of several dB of signal strength. Existing algorithms have also attempted to suppress blending when other blends have recently occurred, using a timer and blend history but neglecting the importance of digital signal quality estimates.

Although it may seem reasonable to fill-in every digital audio gap, this is generally not desirable because corresponding analog and digital audio segments do not necessarily sound the same. Intentionally different audio processing on the analog and digital audio streams degrades the listener experience while blending. In addition, any time or level misalignment between the two streams further degrades the audio quality while blending between them. Perfect alignment is neither well-defined nor practical due to the different processing between the audio streams, resulting in frequency-dependent group delay and level differences.

Blending between audio streams can be physically accomplished by reducing the gain of one stream while complementarily increasing the gain of the other, using a ramp gain-change over about one second. Timing misalignment and group delay differences between the two streams can result in a degraded audio signal during the blend ramp. Therefore, it may be desirable to minimize blend events at the expense of some digital coverage when it is intermittent. Maintaining analog audio is generally preferred over allowing short intermittent digital audio bursts. In addition, field test results and listener feedback suggest that existing blending often occurs too frequently, is sometimes annoying, and can be overly complicated and difficult to configure.

SUMMARY

In one embodiment, a method for processing a digital audio broadcast signal in a radio receiver includes: receiving a digital audio broadcast signal; demodulating the digital audio broadcast signal to produce an analog audio stream and a digital audio stream; determining a digital signal quality value for the digital audio stream; blending an output of the radio receiver from the analog audio stream to the digital audio stream when the digital signal quality value exceeds an adaptive analog-to-digital threshold value; and blending the output of the radio receiver from the digital audio stream to the analog audio stream when the digital signal quality value falls below an adaptive digital-to-analog threshold value, wherein the adaptive digital-to-analog threshold value is lower than the adaptive analog-to-digital threshold value.

In another embodiment, a radio receiver includes processing circuitry configured to receive a digital audio broadcast signal; demodulate the digital audio broadcast signal to produce an analog audio stream and a digital audio stream; determine a digital signal quality value for the digital audio stream; blend an output of the radio receiver from the analog audio stream to the digital audio stream when the digital signal quality value exceeds an adaptive analog-to-digital threshold value; and blend the output of the radio receiver from the digital audio stream to the analog audio stream when the digital signal quality value falls below an adaptive digital-to-analog threshold value, wherein the adaptive digital-to-analog threshold value is lower than the adaptive analog-to-digital threshold value.

DETAILED DESCRIPTION

Embodiments described herein relate to the processing of the digital and analog portions of a digital radio broadcast signal. This description includes an algorithm for blending between analog and digital audio streams for an HD Radio receiver. While aspects of the disclosure are presented in the context of an exemplary HD Radio system, it should be understood that the present disclosure is not limited to HD Radio systems and that the teachings herein are applicable to other forms of digital radio broadcasting as well.

A blend algorithm described herein combines several methods to improve blend performance, yielding generally fewer blends with a modest reduction in digital audio availability. Adaptive analog-to-digital and digital-to-analog blend thresholds are employed. The adaptive thresholds are influenced by several parameters, including:

(1) A filtered signal-quality estimate (i.e., filtered Digital Signal Measure (DSM) based on the Cyclic redundancy check (CRC) success rate that is used to assess longer-term conditions;

(2) Recent blends to analog impose penalties on the filtered DSM to suppress blends back to digital; and (3) The recovery rate from channel impairments that is an adaptive function of signal quality.

The described blend algorithm also accommodates a digital audio stream that does not have an analog backup for blending (i.e., an all-digital signal or multicast channel). In this case, digital signal coverage is increased at the expense of allowing intermittent audio segments. It is generally preferable in this case to allow somewhat spotty digital audio over silence. The algorithm has also been shown to work well with systems employing maximum ratio combining (MRC) of two diversity receivers.

Exemplary AM and FM IBOC DAB transmission systems arrange the digital audio and data in units of Layer 1 frames, which are typically on the order of a second in duration. Some transmission systems are both simplified and enhanced by assigning a fixed number of audio frames to each Layer 1 frame. The audio frame period is the length of time required to render, e.g., play back audio for a user, the samples in an audio frame. For example, if an audio frame contains 1024 samples, and the sampling period is 22.67 µsec, then the audio frame period would be approximately 23.2 milliseconds. A scheduler determines the total number of bits allocated to the audio frames within each Layer 1 frame. The Layer 1 frame duration is advantageous because it may enable sufficiently long interleaving times to mitigate the effects of fading and short outages or noise bursts such as may be expected in a digital audio broadcasting system. Therefore the main digital audio signal can be processed in units of Layer 1 frames, and audio processing, error mitigation, and encoding strategies may be able to exploit this relatively large Layer 1 frame time without additional penalty.

In typical implementations, an audio encoder may be used to compress the audio samples into audio frames in a manner that is more efficient and robust for transmission and reception of the IBOC signal over the radio channel. An audio encoder encodes the audio frames using the bit allocation for each Layer 1 frame. The remaining bits in the Layer 1 frame are typically consumed by the multiplexed data and overhead. Any suitable audio encoder can initially produce the compressed audio frames such as an HDC encoder as developed by Coding Technologies of Dolby Laboratories, Inc.; an Advanced Audio Coding (AAC) encoder; an MPEG-1 Audio Layer 3 (MP3) encoder; or a Windows Media Audio (WMA) encoder. Typical lossy audio encoding schemes, such as AAC, MP3, and WMA, utilize the modified discrete cosine transform (MDCT) for compressing audio data. MDCT based schemes typically compress audio samples in blocks of a fixed size. For example, in AAC encoding, the encoder may use a single MDCT block of length 1024 samples or 8 blocks of 128 samples. Accordingly, in implementations using an AAC coder, for example, each audio frame could be comprised of a single block of 1024 audio samples, and each Layer 1 frame could include 64 audio frames. In other typical implementations, each audio frame could be comprised of a single block of 2048 audio samples, and each Layer 1 frame could include 32 audio frames. Any other suitable combination of sample block sizes and audio frames per Layer 1 frame could be utilized.

In an exemplary IBOC DAB system, the broadcast signal includes main program service (MPS) audio, MPS data (MPSD), supplemental program service (SPS) audio, and SPS data (SPSD). MPS audio serves as the main audio programming source. In hybrid modes, it preserves the existing analog radio programming formats in both the analog and digital transmissions. MPSD, also known as program service data (PSD), includes information such as music title, artist, album name, etc. Supplemental program service can include supplementary audio content as well as PSD. Station Information Service (SIS) is also provided, which comprises station information such as call sign, absolute time, position correlated to GPS, and data describing the services available on the station. In certain embodiments, Advanced Applications Services (AAS) may be provided that include the ability to deliver many data services or streams and application specific content over one channel in the AM or FM spectrum, and enable stations to broadcast multiple streams on supplemental or sub-channels of the main frequency.

Figure 1:
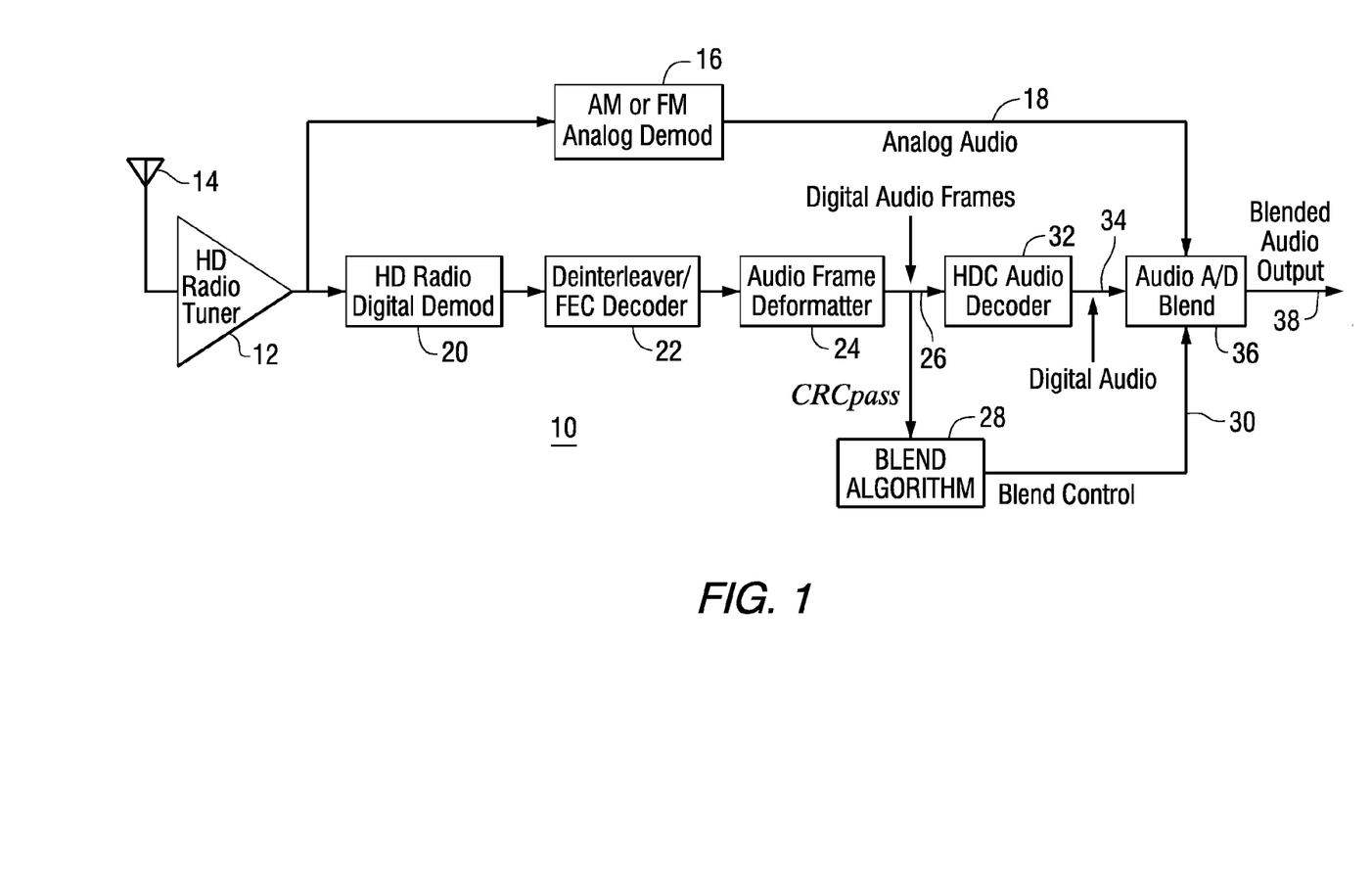
FIG. 1 is a top level functional block diagram of an exemplary HD Radio receiver.

FIG. 1 is a top-level functional diagram of an HD Radio receiver 10 that is configured to receive an IBOC signal and includes a blend algorithm function.

The receiver includes a tuner 12 that receives an in-band on-channel radio signal from an antenna 14. The analog modulated carrier of the radio signal is demodulated by an AM or FM demodulator 16 to produce samples of an analog audio stream on line 18. The digitally modulated subcarriers of the radio signal are demodulated by demodulator 20, deinterleaved and FEC decoded (block 22), and audio frames are deformatted (block 24) to produce digital audio frames on line 26. Cyclic redundancy check (CRC) bits of the audio frames are checked to determine a CRCpass value, as discussed below. A blend algorithm 28 uses the CRCpass value to produce a blend control signal on line 30. An HD Radio codec (HDC) 32 decodes the digital audio frames to produce samples of a digital audio stream on line 34. Audio blend control 36 blends the analog audio stream and the digital audio stream in accordance with the blend control signal to produce an audio output signal on line 38.

The analog audio stream comprises a stream of samples of the analog modulated program material; and the digital audio stream comprises a stream of samples of the digitally modulated program material.

Details of the blend algorithm described below are unique to HD Radio reception with an available analog backup signal (e.g., the hybrid MPS case). Assume there are 32 audio frames (AF) per Layer 1 (L1) frame (about 1.486 seconds), resulting in about 21.533 audio frames per second. The average size of each coded audio frame depends on the allocated throughput of its audio stream. CRC pass/fail status is determined for each AF. Variable CRCpass=1 if it checks, 0 otherwise. A "soft" CRCpass value normalized between 0 and 1 may be provided by the audio codec when the audio frame is only partially corrupted.

As in existing blend algorithms, the CRCpass sequence is initially filtered to yield a Digital Signal Measure (DSM) that ranges between 0 and 1. The DSM triggers a blend to analog when it falls below an adaptive digital-to-analog threshold Th_d2a, or to digital when it exceeds an adaptive analog-to-digital threshold Tha_2d. The DSM is further smoothed using an IIR filter with a relatively long time constant. The resulting signal DSMfilt is used to dynamically adjust the adaptive blend thresholds. As used in this description, an adaptive threshold is a threshold having a value that can be changed (e.g., adjusted or adapted) based on measured signals or calculated operating parameters. In the described embodiment, the adaptive thresholds Th_a2d and Th_d2a are a variable function of DSMfilt; they may change only when DSMfilt is above a fixed thresholds Thres. These adaptive thresholds could be dynamically changed as often as every audio frame.

Figure 2:
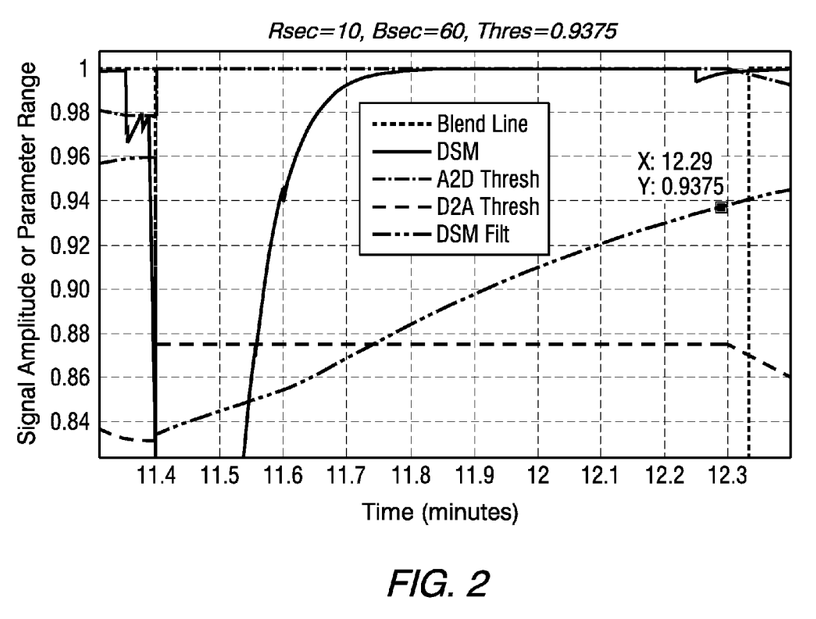
FIG. 2 is a graph that illustrates a digital audio recovery mechanism following a blend to analog audio.

FIG. 2 illustrates the behavior of these signals following a blend to analog, as recorded during field trials. The blend line transitions from 1 (digital) to 0 (analog) when DSM drops below Th_d2a. Upon blending to analog audio, DSMfilt is instantaneously penalized (reduced) by an amount proportional to its value. This immediately fixes Th_a2d to 1, thereby preventing a rapid blend back to digital audio (because DSM cannot exceed unity). Th_a2d remains pegged at 1 until DSMfilt rises from its post-blend nadir to a fixed threshold Thres=0.9375. The audio then blends back to digital when DSM rises above Th_a2d.

FIG. 2 illustrates a digital audio recovery mechanism following a blend to analog audio. This mechanism effectively precludes blending to digital audio until the long-term signal quality is high. This is a marked improvement over the existing blend algorithm, which allows blends back to digital as soon as a simple timer expires, regardless of long-term digital signal quality. The digital audio recovery time after blending to analog is controlled by Bsec, a user-defined configuration parameter equal to 40, 60, or 90 seconds. In one embodiment, 60 seconds is the recommended default value.

Figure 3:
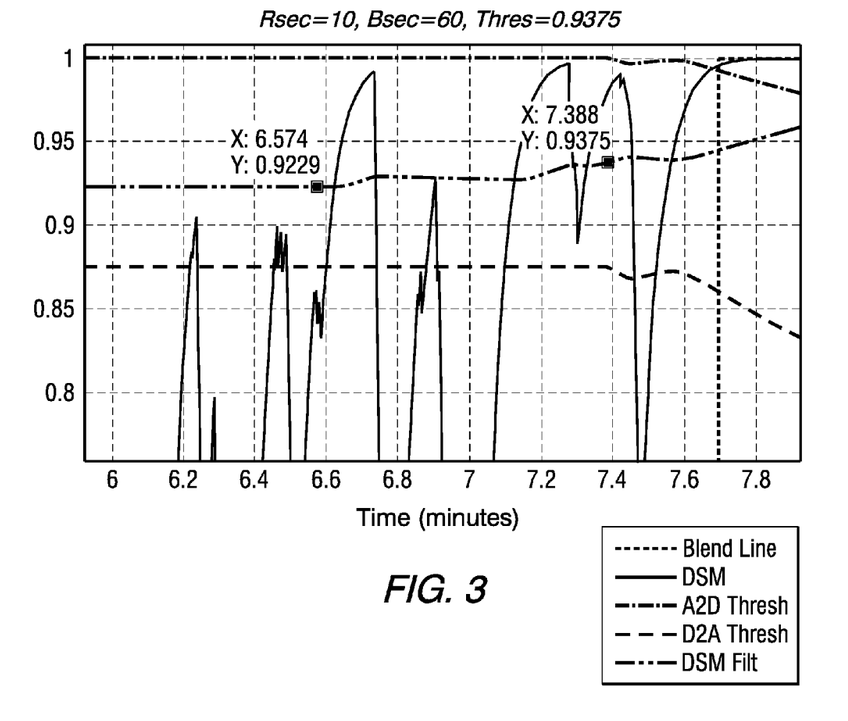
FIG. 3 is a graph that illustrates a digital audio recovery mechanism following a long signal outage.

After a long signal outage while in analog (e.g., due to a tunnel or other blockage), DSMfilt will eventually settle to a value of Limit. Upon signal recovery, it will take at least Rsec=10 seconds for DSMfilt to exceed Thres, thereby enabling a blend to digital. This is illustrated in FIG. 3, where Limit=0.9229. Notice that Th_a2d remains pegged at 1 until DSMfilt exceeds Thres. The blend to digital does not occur until DSM exceeds Th_a2d. In this case, the time it takes for DSMfilt to rise from Limit to Thres is much longer than Rsec, because digital signal quality is imperfect during the recovery.

The overall effect of these digital audio recovery mechanisms is that time spent in analog is often extended. Rapid, brief blends to analog tend to merge into a single, longer blend. Although digital audio availability is necessarily reduced, this is usually preferable to "choppy" audio with several blends in rapid succession. In general, there is a net reduction in the number of blends, unless the blend events are sufficiently isolated.

Figure 4:
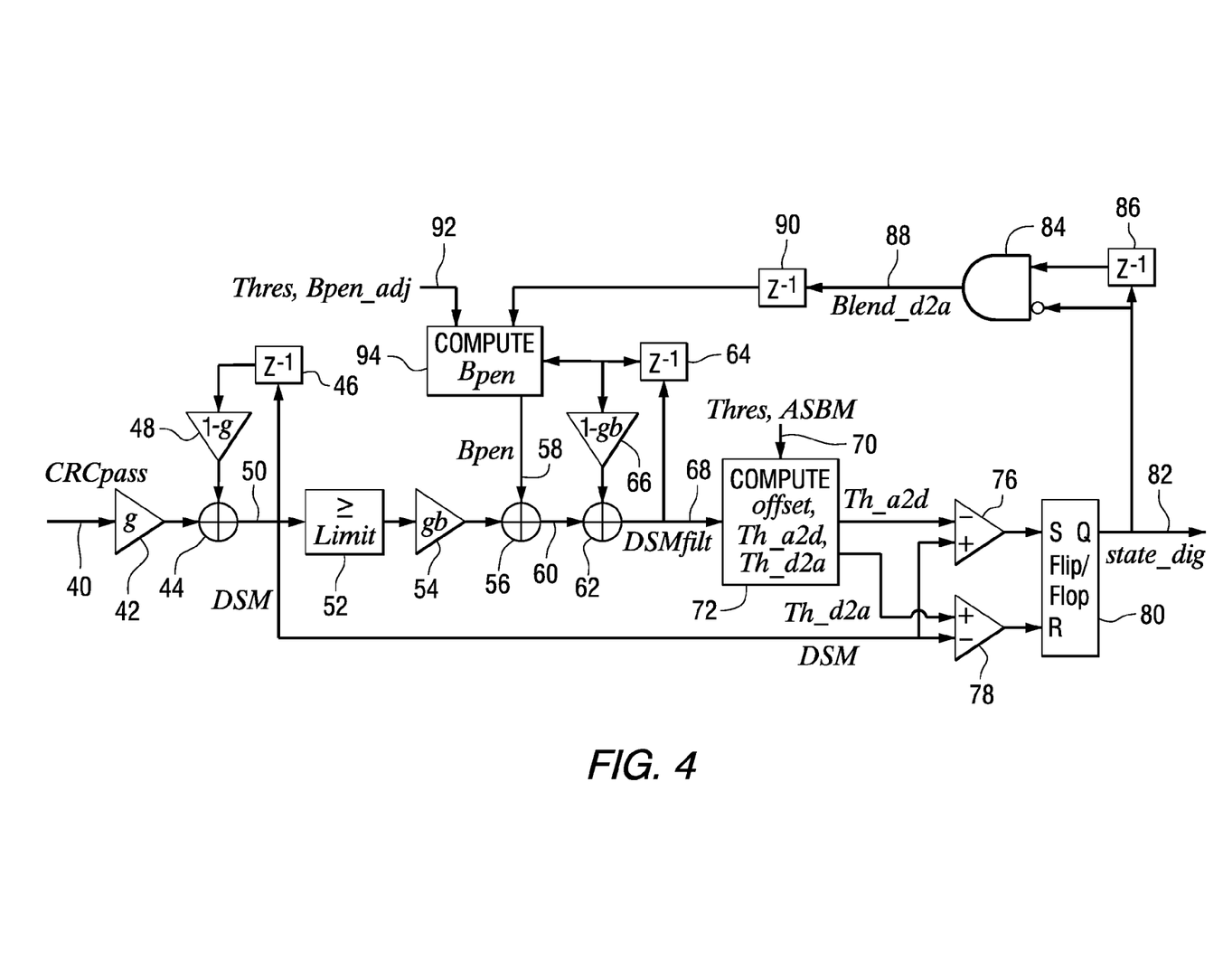
FIG. 4 is a functional block diagram of an exemplary blend algorithm.

FIG. 4 is a functional block diagram of an exemplary blend algorithm. The CRCpass signal on line 40 is amplified by amplifier 42 and passed to an adder 44. The output of the adder is delayed by delay block 46, amplified by amplifier 48 and returned to adder 44. This results in a digital signal measure (DSM) value on 50. The DSM is limited on block 52, amplified by amplifier 54 and passed to adder 56, where it is added to a penalty signal Bpen on line 58. The resulting signal on line 60 passes to adder 62. The output of the adder 62 is delayed by delay block 64, amplified by amplifier 66 and returned to adder 62. This produces the DSMfilt signal on line 68. The DSMfilt signal is used in combination with the Thres and ASBM signals on line 70 to compute an offset and thresholds Th_a2d, and Th_d2a as shown in block 72. Th_a2d and Th_d2a are compared to DSM in comparators 76 and 78. The outputs of comparators 76 and 78 are used as inputs to flip flop 80 to produce a state_dig signal on line 82. The state_dig signal is sent to an inverting input of AND gate 84 and delay block 86 produces a delayed state_dig signal for the other input of AND gate 84 to produce the Blend_d2a signal on line 88. The Blend_d2a signal is delayed by delay block 90 and used in combination with the Thres and Bpen_adj signals on line 92, and the delayed DSMfilt, to compute Bpen as shown in block 94.

The described blend algorithm can be summarized with the following 9 steps:

Step 1: Initialize parameters.

```
"Independent constants------------------------------------"
Thres = 0.9375   ; "greater values reduce blends and coverage"
Rsec = 10        ; "Blend MPSaudio recovery time (sec) after a long outage"
Bsec = 60        ; "Blend MPSaudio recovery time (sec) after d2a blend"
g = 0.015625     ; "1/64 results in <0.5 second d2a responseto outage"
gb = 0.0009765625 ; "1/1024 longer - term filter constant"
ASBM = 1 ; Analog Signal Blend Metric; max 1, min 0 for digital only.
"Dependent constants------------------------"
Limit = 1 − (1 − Thres) · exp {Rsec · gb · 21.533}
Bpen _adj = exp {Bsec · gb · 21.533} − 2
"Initial conditions------------------------------------------"
DSM = Thres
DSMfilt = Thres
state _dig = 0 ; "start in analog state"
Blend _d2a = 0
```

Algorithm loop iterations begin next for each CRCpass input.

Step 2: Determine DSM. The CRCpass sequence is input to a first-order IIR filter to produce the DSM signal. The DSM is updated for each CRCpass index n. This is an indication of digital audio quality, where the DSM value (between 0 and 1) is related to the fraction of valid audio frames.

$$DSM = (1-g) \cdot DSM + g \cdot CRCpass_n$$

Steps 3, 4, and 5 affect blend control only when ASBM>0 (MPS audio with analog backup).

Step 3: Determine Bpen. A penalty Bpen is applied to reduce DSMfilt (step 4) immediately after blending from digital to analog. This penalty decreases the probability of a premature blend back to the digital audio stream. The poorer the signal quality at the time of the blend to analog, the greater the penalty. A larger value of Bsec increases the value of Bpen_adj, which in turn increases Bpen.

$$Bpen = Blend\_d2a \cdot [Thres - 1 - Bpen\_adj \cdot (1 - DSMfilt)]$$

Step 4: Determine DSMfilt. The DSM signal itself is IIR filtered to produce a DSMfilt signal. This is a longer-term indication of digital audio quality that is used to adjust the dynamic blend thresholds. The value of Limit is dependent on the initialization constant Rsec. In poor signal conditions, DSMfilt will settle to Limit if no blends occur. DSMfilt can fall below Limit only after the blend penalty Bpen has been assessed.

$$DSMfilt = (1-gb) \cdot DSMfilt + gb \cdot \max\{Limit, DSM\} + Bpen$$

Step 5: Determine offset. An offset value is computed as a function of DSMfilt for determining the adaptive thresholds Th_a2d and Th_d2a. This adaptive process has the effect of lowering both thresholds when the longer-term digital signal quality (DSMfilt) has been good, favoring selection of the digital signal. For signals without an analog backup (e.g., all-digital waveforms or multicast channels), ASBM=0 and thresholds Th_a2d and Th_d2a are simply fixed functions of Thres.

$$offset = \max\{0, 1 - Thres - (1 - DSMfilt) \cdot ASBM\}$$

Step 6: Determine Th_a2d. Th_a2d is fixed to 1 by forcing offset=0 when the longer-term digital signal quality has been poor (DSMfilt<Thres). A transition to digital audio cannot be initiated in this case since DSM can never exceed 1. The digital transition threshold is lowered when DSMfilt exceeds Thres, resulting in offset>0. Th_a2d reaches a minimum value of Thres when DSMfilt=1.

$$Th\_a2d = 1 - offset$$

Step 7: Determine Th_d2a. Like Th_a2d, the Th_d2a threshold is also lowered when the longer-term signal quality DSMfilt improves beyond Thres. This threshold is raised to a maximum of 0.875 when DSMfilt degrades, making it more likely to transition to analog audio. Th_d2a reaches a minimum value of 0.75 when DSMfilt=1 and Thres=0.9375.

$$Th\_d2a = 0.875 - 2 \cdot offset$$

Step 8: Determine state_dig. The state_dig signal indicates whether the blend algorithm selects the digital or analog audio path. The appropriate transition is initiated when DSM exceeds Th_a2d, or falls below Th_d2a. The previous state is saved as state_dig_prev.

$$state\_dig\_prev = state\_dig$$

$$state\_dig = \begin{cases} 1; & \text{if } DSM > Th\_a2d \\ 0; & \text{if } DSM < Th\_d2a \end{cases}$$

Step 9: Determine Blend_d2a. A blend from digital to analog is indicated by observing the current and previous audio states. Blend_d2a is set to 1 only on iterations where state_dig changes from digital to analog. It is used to enable the application of the blend penalty Bpen to DSMfilt.

$$Blend\_d2a = (1 - state\_dig) \cdot state\_dig\_prev$$

An example of pseudocode for the described blend algorithm is:

```
"BLEND ALGORITHM"
"Initialize parameters"
Thres = 0.9375    ; "greater values reduce blends and coverage"
Rsec = 10         ; "Blend MPSaudio recovery time (sec) after a long outage"
Bsec = 60         ; "Blend MPSaudio recovery time (sec) after d2a blend"
g = 0.015625      ; "1/64 results in < 0.5 second d2a responseto outage"
gb = 0.0009765625 ; "1/1024 longer - term filter constant"
Limit = 1 − (1 − Thres) · exp {Rsec · gb · 21.533}
Bpen _adj = exp {Bsec · gb · 21.533} − 2
DSM = Thres
DSMfilt = Thres
ASBM = 1 ; Analog Signal Blend metric; max 1, min 0 for digital only
state _dig = 0 ; "start in analog state"
Blend _d2a = 0
"-------------------------------------------------"
For n = 1...... ;"sequence of audio frames with CRC"
   DSM = (1 − g) · DSM + g · CRCpass_n
   Bpen = Blend _d2a . [Thres − 1 − Bpen _adj · (1 − DSMfilt)]
   DSMfilt = (1 − gb) · DSMfilt + gb · max {Limit,DSM} + Bpen
   offset = max {0,1 − Thres − (1 − DSMfilt) · ASBM}
   Th _a2d = 1 − offset
   Th _d2a = 0.875 − 2 · offset
   state _dig _prev = state _dig
   if DSM > Th _a2d then state _dig = 1
   if DSM < Th _d2a then state _dig = 0
   Blend _d2a = (1 − state dig) · state _dig _prev
```

Recommended initial values for parameters Thres, Rsec, Bsec and ASBM are described next.

Thres: This parameter indicates the smallest value of DSMfilt that will produce a positive offset. The analog-to-digital threshold Th_a2d is allowed to drop below 1 when DSMfilt>Thres, permitting blends to digital in good signal conditions.

Rsec: The DSM input to the long-term IIR filter is restricted to prevent values below Limit. This limiting reduces the audio recovery time when digital signal quality improves after a long signal outage. The duration of this recovery time is determined by the initialization constant Rsec. With maximum digital signal quality (DSM=1), it takes Rsec seconds to blend to digital audio (this is the time it takes for DSMfilt to rise from Limit to Thres).

Bsec: Bpen is the penalty that imposes an instant reduction on DSMfilt when a blend to analog occurs. It increases time in analog to suppress rapid blends. The value of Bpen is determined by initialization constant Bsec (which indicates the digital signal recovery time after a blend), and by the level of DSMfilt at the time of the blend to analog. If DSMfilt=Thres when a blend to analog occurs, and digital signal quality is perfect following the blend, then the audio will blend back to digital in Bsec seconds.

ASBM: The Analog Signal Blend Metric (ASBM) is set to 1 when analog backup audio is available for blending during a digital outage (e.g., hybrid MPS audio). ASBM is also set to 1 for an enhancement audio stream when used in core/enhancement mode. It is set to 0 for all other digital-only audio streams (e.g., all-digital waveforms and multicast channels), disabling the longer-term blend-inhibiting effects of DSMfilt, and fixing blend thresholds. Although ASBM is described here as a binary value, it may be used as a variable between 0 and 1 for future purposes.

Next consider a digital audio recovery after a digital outage (for ASBM=1).

The initialization constant Rsec represents the minimum digital audio recovery time after a long digital signal outage. The value of Limit, which is controlled by Rsec, cannot exceed Thres. Lower values of Limit increase digital audio recovery time, while recovery time is near zero when Limit=Thres.

DSMfilt approaches Limit after a long digital signal outage. When the digital signal recovers, DSMfilt increases from Limit and eventually reaches Thres in Rsec seconds, assuming a perfect digital signal. A transition from analog to digital audio is permitted only after DSMfilt exceeds Thres; this is when offset is adjusted such that Th_a2d drops below 1.

The advantage of a lower Limit is that a transition from analog to digital audio is slowed in an attempt to avoid an intermittent recovery of digital audio as the signal quality improves after a digital outage. Instead, the transition to digital audio is permitted only after the digital signal has been solidly strong during the digital audio recovery time. Derivation of Limit as a function of digital audio recovery time (Rsec) and Thres is described next.

The increasing value of DSMfilt can be computed during digital audio recovery as a function of the audio frame index k and IIR filter gain gb, starting at DSMfilt=Limit. The discrete response of the IIR filter for DSMfilt is approximated as a continuous exponential.

$$DSMfilt(k) = 1 - (1 - \text{Limit}) \cdot \exp\{-k \cdot gb\}$$

When the value of DSMfilt crosses Thres, a transition from analog to digital audio is enabled because the adaptive analog-to-digital threshold adjustment (offset) reduces Thres_a2d below 1. The digital recovery time is $Rsec = k_{thres} \cdot Taf$, where $k_{thres}$ is the kth audio frame when DSMfilt crosses Thres_a2d.

The relationship among Rsec, Limit, and Thres can be found by setting DSMfilt to Thres, and solving for k with appropriate scaling of audio-frame index to audio-frame time Taf (0.046 seconds).

$$Rsec = \frac{Taf}{gb} \cdot \ln\left(\frac{1 - \text{Limit}}{1 - Thres}\right)$$

The value of Limit is found by first selecting Thres and Rsec, and then solving for the value of Limit.

$$\text{Limit} = 1 - (1 - Thres) \cdot \exp\{Rsec \cdot gb/Taf\}$$

Figure 5:
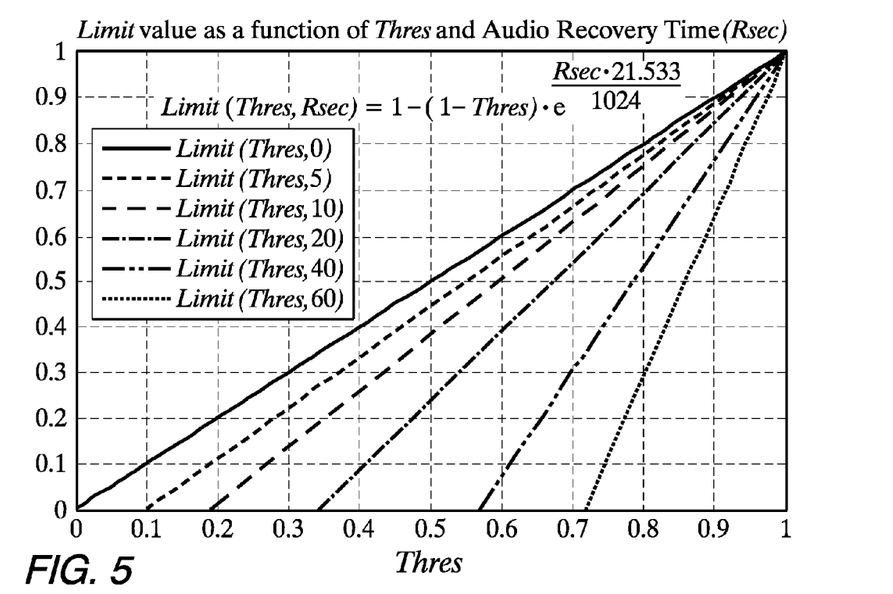
FIG. 5 is a graph of a limit value as a function of a threshold and audio recovery time.

FIG. 5 shows the fixed initialization value of Limit is determined as a function of Thres and Rsec.

Next consider a digital audio recovery after a blend to analog (for ASBM=1).

The initialization constant Bsec is the digital audio recovery time after a blend to analog, assuming DSMfilt=Thres just prior to blending, and a perfect digital signal after the blend. The value of DSMfilt is reduced by Bpen after a blend from digital to analog audio. The amount of DSMfilt reduction depends upon the value of DSMfilt at the time of the blend and constant Bpen_adj.

$$Bpen = \text{Blend\_d2a} \cdot [Thres - 1 - Bpen\_adj \cdot (1 - DSMfilt)]$$

The fixed value of Bpen_adj is determined at initialization and is a function of Bsec.

An example derivation of the Bpen_adj expression is described next.

The blend recovery time Bsec is derived in the same manner as Rsec, except the value of DSMfilt=Thres+Bpen immediately after the blend penalty replaces Limit in the Rsec expression.

$$Bsec = \frac{Taf}{gb} \cdot \ln\left(\frac{1 - Thres - Bpen}{1 - Thres}\right).$$

Solving for the analytical value of Bpen, $$Bpen = (Thres - 1) \cdot \left(\exp\left\{\frac{Bsec \cdot gb}{Taf}\right\} - 1\right).$$

The fixed initialization value Bpen_adj is found by equating the analytical and algorithmic expressions for Bpen, and then solving for Bpen_adj as a function of Bsec, assuming worst case when DSMfilt=Thres.

$$(Thres - 1) \cdot \left(\exp\left\{\frac{Bsec \cdot gb}{Taf}\right\} - 1\right) = Thres - 1 + Bpen\_adj \cdot (DSMfilt - 1)$$

$$Bpen\_adj = \exp\left\{\frac{Bsec \cdot gb}{Taf}\right\} - 2$$

Figure 6:
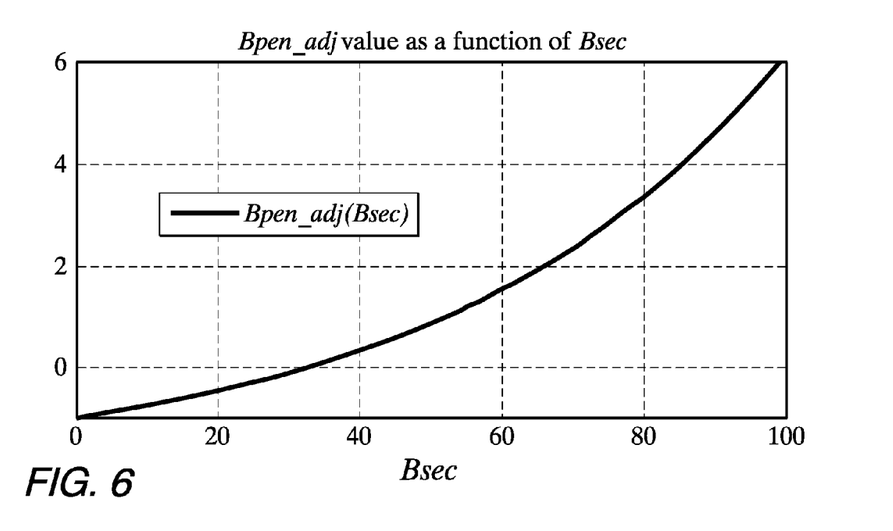
FIG. 6 is a graph of an adjustment value as a function of digital audio recovery time.

The fixed initialization value of Bpen_adj is determined as a function of Bsec. The value of Bpen_adj is plotted as a function of Bsec in FIG. 6.

Next consider an audio frame error rate (FER) analysis (for ASBM=1). The FER performance of the described blend algorithm is compared to an existing blend algorithm in the following discussion.

The FER range can be computed for the improved blend algorithm at steady-state equilibrium when DSM=DSMfilt. The highest steady-state FER_upper value during digital audio selection is found by setting DSM=Th_d2a when DSMfilt=DSM, and recognizing that FER_upper=1−DSM.

$$DSM = 0.875 - 2 \cdot \text{offset} = 0.875 - 2 \cdot (DSM - Thres)$$

$$FER\_upper = 0.70833 - \frac{2 \cdot Thres}{3}$$

$$FER\_upper = 0.08333 \text{ when } Thres = 0.9375.$$

The lowest steady-state FER_lower value during analog audio selection is solved by setting DSM=Th_a2d when DSMfilt=DSM.

$$DSM=1-\text{offset}=1-(DSM-Thres)=1\pm Thres-DSM$$

$$FER\_lower = \frac{1-Thres}{2}$$

$$FER\_lower=0.03125 \text{ for } Thres=0.9375.$$

Figure 7:
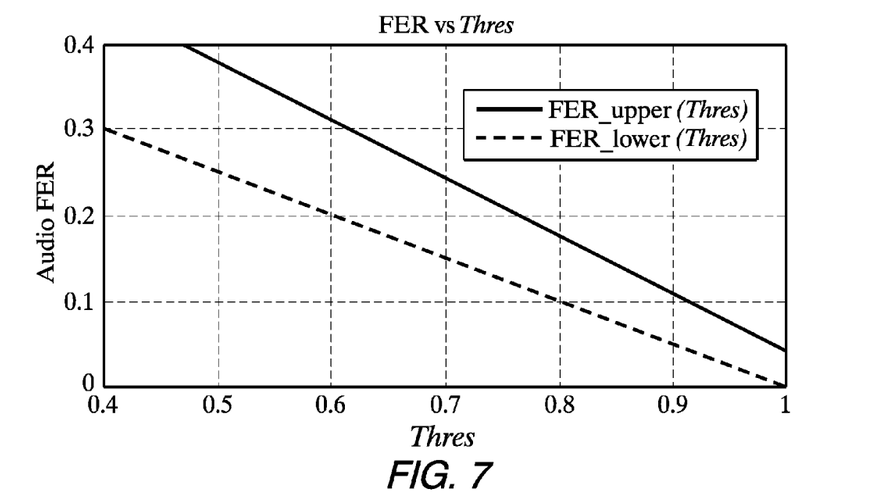
FIG. 7 is a graph of frame error rate versus a threshold.

The relationship between Thres, FER_upper, and FER_lower for the improved blend algorithm is plotted in FIG. 7.

FER_upper and FER_lower for the existing blend algorithm are solved in a similar manner at steady-state equilibrium. The details of this analysis are omitted here for convenience. The steady state expression is $$Thres=(1-FER)\cdot[Thres\cdot Ga\_r+(1-Ga\_r)]+FER\cdot(Thres\cdot Ga\_f)$$

where Ga_r is the rising DSM IIR gain, Ga_f is the falling DSM IIR gain, and Thres is either Th_a2d or Th_d2a, depending on the lower or upper FER value.

Solving for FER values, $$FER\_lower = \frac{(Ga\_r-1)\cdot(1-Th\_a2d)}{Ga\_r\cdot(1-Th\_a2d)+Ga\_f\cdot Th\_a2d-1} \text{ and}$$

$$FER\_upper = \frac{(Ga\_r-1)\cdot(1-Th\_d2a)}{Ga\_r\cdot(1-Th\_d2a)+Ga\_f\cdot Th\_d2a-1}.$$

Table 2 shows FER_upper and FER_lower as a function of blend threshold levels (Q1 through Q4) for the existing blend algorithm. Q1 represents the highest audio quality with the fewest corrupted digital audio frames. This is achieved through more muting (or blending to analog) during intermittent digital coverage periods. Q4 offers the lowest digital audio quality but greater digital coverage. Q3 is the usual default level for a hybrid signal with an analog audio backup.

TABLE 2

FER as a function of blend threshold Q for an existing blend algorithm.

| Q | Ga_r | Ga_f | Th_a2d | Th_d2a | FER_lower | FER_upper |
|---|------|------|--------|--------|-----------|-----------|
| 1 | 31/32 | 17/32 | 0.9375 | 0.8175 | 0.0044 | 0.0147 |
| 2 | 31/32 | 21/32 | 0.8125 | 0.6875 | 0.0205 | 0.0397 |
| 3 | 31/32 | 47/64 | 0.59375 | 0.40625 | 0.074 | 0.147 |
| 4 | 31/32 | 59/64 | 0.46875 | 0.3515625 | 0.312 | 0.425 |

Figure 8:
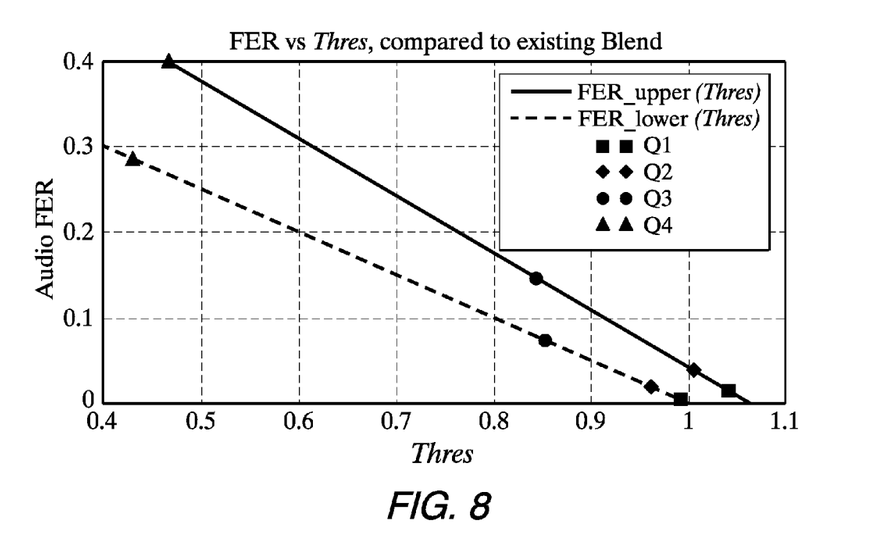
FIG. 8 is a graph of frame error rate versus a threshold compared to an existing blend technique.

The plot in FIG. 8 compares the FER_upper and FER_lower values of the improved blend algorithm with the existing blend algorithm. The existing blend FER values at Q1 through Q4 are represented as points (symbols) plotted at Thres values corresponding to the improved blend algorithm.

In FIG. 8, FER thresholds for the improved blend algorithm with default Thres=0.9375 lie between Q2 and Q3, but closer to Q2. Notice that FER_upper for the improved blend algorithm would require Thres to exceed 1 for existing blend audio qualities Q1 and Q2. This cannot be achieved with the improved blend algorithm, although an adjustment of Th_d2a could be made to accommodate this (not recommended).

$$FER\_lower(0.9375)=0.03125, FER\_upper(0.9375)=0.08333$$

The blend FER thresholds corresponding to the existing blend at Q3 would approximately correspond to Thres=0.84.

Recommended default parameter values will now be described.

For hybrid HD Radio waveforms with analog backup audio, or for the enhancement audio stream in core/enhancement mode:

$$ASBM=1, Thres=0.9375, Rsec=10, Bsec=60.$$

For digital-only audio streams (non-enhancement) without analog backup audio (e.g., all-digital waveforms or multicast channels):

$$ASBM=0, Thres=0.688 (Rsec \text{ and } Bsec \text{ are effectively disabled so their values are arbitrary}).$$

Additionally, although not recommended, FM SPS multicast (e.g., HD2) audio FER performance can be made equivalent to the existing blend algorithm performance if variable th_d2a is fixed to a value of 0.575. In addition, Bsec could be reduced from 60 to 40 to increase both digital audio availability and the number of blends, or increased to 90 to further reduce the number of blends at the expense of digital audio availability.

These settings are summarized in Table 1.

TABLE 1

Recommended default parameter values.

| | Single-stream digital audio | Core digital audio | Enhancement digital audio | Single-stream digital audio | Core digital audio | Enhancement digital audio |
|---|---|---|---|---|---|---|
| Analog audio backup? | Y | Y | Y | N | N | N |
| ASBM | 1 | 1 | 1 | 0 | 0 | 1 |
| Thres | 0.9375 | 0.9375 | 0.9375 | 0.688 | 0.688 | 0.9375 |
| Bsec | 60 | 60 | 60 | N/A | N/A | 60 |
| Rsec | 10 | 10 | 10 | N/A | N/A | 10 |

From the above description it should be apparent that a method for processing a digital audio broadcast signal in a radio receiver can be implemented by receiving a digital audio broadcast signal; demodulating the digital audio broadcast signal to produce an analog audio stream and a digital audio stream; determining a digital signal quality value for the digital audio stream; blending an output of the radio receiver from the analog audio stream to the digital audio stream when the digital signal quality value exceeds an adaptive analog-to-digital threshold value; and blending the output of the radio receiver from the digital audio stream to the analog audio stream when the digital signal quality value falls below an adaptive digital-to-analog threshold value, wherein the adaptive digital-to-analog threshold value is lower than the adaptive analog-to-digital threshold value.

In the described embodiment, the recovery rate from channel impairments is determined as an adaptive function of signal quality.

In the described embodiment, the digital signal quality value DSM (i.e. a first digital signal quality value) itself can be IIR filtered to produce a longer-term digital signal quality value DSMfilt (i.e. a second digital signal quality value). This longer-term indication of digital audio quality is used to adjust the adaptive blend thresholds. The penalty Bpen is applied to reduce DSMfilt immediately after blending from digital to analog. This penalty decreases the probability of a premature blend back to the digital audio stream. An offset value is computed as a function of DSMfilt for determining the adaptive thresholds Th_a2d and Th_d2a. This adaptive process has the effect of lowering both thresholds when the longer-term digital signal quality (DSMfilt) has been good, favoring selection of the digital signal. The initialization constant Rsec represents the minimum digital audio recovery time after a long digital signal outage. The initialization constant Bsec is the digital audio recovery time after a blend to analog, assuming DSMfilt=Thres just prior to blending, and a perfect digital signal after the blend. When the long-term signal quality is good, causing DSMfilt to rise above Thres, the analog-to-digital threshold Th_a2d is reduced below 1, permitting a blend back to digital when DSM exceeds Th_a2d.

The functions shown in FIG. 4 can be implemented in the circuitry of a radio receiver, using for example, one or more processors that are programmed or otherwise configured to perform the functions described herein. Other hardware embodiments, as well as software embodiments and combinations thereof may also be used to implement the described method(s).

The described blend algorithm can be used to fill-in digital audio outages with a time-diverse analog (from the analog demodulator) audio stream. Maintaining the analog audio is generally preferred over allowing short intermittent digital audio bursts. The algorithm attempts to fill-in digital audio gaps while minimizing the number of blend events to accomplish this. Although this does not maximize the digital audio coverage, the audio quality perceived by the listener is improved. The algorithm is applicable to both the FM and AM 1130C systems.

While the present invention has been described in terms of its preferred embodiments, it will be apparent to those skilled in the art that various modifications can be made to the described embodiments without departing from the scope of the invention as defined by the following claims.

What is claimed is:

1. A method for processing a digital audio broadcast signal in a radio receiver, the method comprising:
   receiving a digital audio broadcast signal;
   demodulating the digital audio broadcast signal to produce an analog audio stream and a digital audio stream;
   determining a digital signal quality value for the digital audio stream;
   blending an output of the radio receiver from the analog audio stream to the digital audio stream when the digital signal quality value exceeds an adaptive analog-to-digital threshold value; and
   blending the output of the radio receiver from the digital audio stream to the analog audio stream when the digital signal quality value falls below an adaptive digital-to-analog threshold value, wherein the adaptive digital-to-analog threshold value is lower than the adaptive analog-to-digital threshold value.

2. The method of claim 1, wherein the digital audio stream includes a plurality of audio frames, each including a cyclic redundancy check (CRC), and the method further comprises:
   determining a CRC pass/fail status value for each audio frame, wherein the digital signal quality value is determined by filtering a plurality of CRC pass/fail status values.

3. The method of claim 2, wherein:
   each of the CRC pass/fail status values is a 0, a 1, or a normalized value between 0 and 1.

4. The method of claim 1, wherein:
   the digital signal quality value is filtered to produce a longer term digital signal quality value, and the longer term digital signal quality value is used to adjust the adaptive digital-to-analog threshold value and the adaptive analog-to-digital threshold value.

5. The method of claim 4, wherein:
   the longer term digital signal quality value is reduced immediately after blending from the digital audio stream to the analog audio stream.

6. The method of claim 4, further comprising:
   computing an offset value as a function of the longer term digital signal quality value; and
   using the offset value to adjust the adaptive analog-to-digital threshold value and the adaptive digital-to-analog threshold value.

7. The method of claim 1, further comprising:
   determining a longer-term digital signal quality measure recovery rate as an adaptive function of signal quality and using the longer term digital signal quality value to adjust the adaptive digital-to-analog threshold value and the adaptive analog-to-digital threshold value.

8. The method of claim 1, wherein:
   the digital signal quality value is filtered to produce a longer term digital signal quality value, and blending the output from analog to digital is prevented until the longer term digital signal quality exceeds a fixed threshold.

9. The method of claim 1, further comprising:
   setting a minimum digital audio recovery time after a digital signal outage.

10. The method of claim 1, further comprising:
    setting a minimum digital audio recovery time after a blend to analog.

11. A radio receiver comprising:
    processing circuitry configured to receive a digital audio broadcast signal; demodulate the digital audio broadcast signal to produce an analog audio stream and a digital audio stream; determine a digital signal quality value for the digital audio stream; blend an output of the radio receiver from the analog audio stream to the digital audio stream when the digital signal quality value exceeds an adaptive analog-to-digital threshold value; and blend the output of the radio receiver from the digital audio stream to the analog audio stream when the digital signal quality value falls below an adaptive digital-to-analog threshold value, wherein the adaptive digital-to-analog threshold value is lower than the adaptive analog-to-digital threshold value.

12. The radio receiver of claim 11, wherein the digital audio stream includes a plurality of audio frames, each including a cyclic redundancy check (CRC), and the circuitry is further configured to determine a CRC pass/fail status value for each audio frame, wherein the digital signal quality value is determined by filtering a plurality of CRC pass/fail status values.

13. The radio receiver of claim 12, wherein:
    each of the CRC pass/fail status values is a 0, a 1, or a normalized value between 0 and 1.

14. The radio receiver of claim 11, wherein the circuitry is further configured to filter the digital signal quality value to produce a longer term digital signal quality value, and to use the longer term digital signal quality value to adjust the adaptive digital-to-analog threshold value and the adaptive analog-to-digital threshold value.

15. The radio receiver of claim 14, wherein the longer term digital signal quality value is reduced immediately after blending from the digital audio stream to the analog audio stream.

16. The radio receiver of claim 14, wherein the circuitry is further configured to compute an offset value as a function of the longer term digital signal quality value; and to use the offset value to adjust the adaptive analog-to-digital threshold value and the adaptive digital-to-analog threshold value.

17. The radio receiver of claim 11, wherein the circuitry is further configured to determine a longer-term digital signal quality measure recovery rate as an adaptive function of signal quality and to use the longer term digital signal quality value to adjust the adaptive digital-to-analog threshold value and the adaptive analog-to-digital threshold value.

18. The radio receiver of claim 11, wherein the circuitry is further configured to filter the digital signal quality value to produce a longer term digital signal quality value, and to prevent blending the output from analog to digital until the longer term digital signal quality exceeds a fixed threshold.

19. The radio receiver of claim 11, wherein the circuitry is further configured to set a minimum digital audio recovery time after a digital signal outage.

20. The radio receiver of claim 11, wherein the circuitry is further configured to set a minimum digital audio recovery time after a blend to analog.

* * * * *